(12) United States Patent
Yu

(10) Patent No.: US 7,303,333 B2
(45) Date of Patent: Dec. 4, 2007

(54) THERMOMETER WITH SOFT FLEXIBLE PROBE

(75) Inventor: Chu-Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 0 days.

(21) Appl. No.: 11/408,297

(22) Filed: Apr. 21, 2006

(65) Prior Publication Data

US 2007/0248144 A1 Oct. 25, 2007

(51) Int. Cl.
*G01K 1/00* (2006.01)
(52) U.S. Cl. .................................... 374/208; 374/185
(58) Field of Classification Search ............... 374/208, 374/170, 183, 185; 600/549
See application file for complete search history.

(56) References Cited

U.S. PATENT DOCUMENTS

| | | | |
|---|---|---|---|
| 4,688,949 A * | 8/1987 | Hatakenaka | ................ 374/183 |
| 4,729,672 A * | 3/1988 | Takagi | ........................ 374/208 |
| 5,013,161 A | 5/1991 | Zaragoza et al. | |
| 5,133,606 A * | 7/1992 | Zaragoza et al. | ........... 374/208 |
| 5,165,798 A | 11/1992 | Watanabe | |
| 5,632,555 A * | 5/1997 | Gregory et al. | ............. 374/102 |
| 6,379,039 B1 | 4/2002 | Tseng | |
| 6,419,388 B2 * | 7/2002 | Lee | ............................ 374/208 |
| 6,610,439 B1 * | 8/2003 | Kimoto et al. | ............... 374/208 |
| 6,829,820 B2 * | 12/2004 | Adachi et al. | ............... 374/208 |
| 6,981,796 B2 | 1/2006 | Hsieh | |
| 2004/0109491 A1* | 6/2004 | Chen | .......................... 374/163 |

* cited by examiner

*Primary Examiner*—Yaritza Guadalupe-McCall
(74) *Attorney, Agent, or Firm*—Thomas, Kayden, Horstemeter & Risley

(57) ABSTRACT

A thermometer is constituted by a flexible probe body and a metal tip member with a thermal contact surface. The flexible probe body including a narrower space neighboring the metal tip member and a wider space communicated with the narrower space is secured to the metal tip member by a hook structure. A thermal sensor mounted on the inside of the thermal contact surface of the metal tip member is adapted for sensing the temperature of the thermal contact surface and producing a temperature signal. A set of lead wires is coupled to the thermal sensor for transmission of the temperature signal. In particular, a thermally conductive adhesive material filling the metal tip member, the narrower space and the wider space is cured to integrately form the hook structure.

11 Claims, 6 Drawing Sheets

THERMOMETER WITH SOFT FLEXIBLE PROBE

BACKGROUND OF THE INVENTION

1. Field of the Invention

The invention relates to the field of thermometers, and more particularly to the field of medical thermometers employing a thermal probe for measurement of a patient's temperature, although it is equally applicable to other temperature measurement fields.

2. Description of the Related Art

Electronic thermometers generally offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

Additionally, an oral measurement can be easily made without causing discomfort to the patient if the probe section is formed from a soft flexible material such as rubber, providing a shape that is well-fitted to the mouth. Accordingly, such as electronic clinical thermometer including mouth-friendly flexible probes have been made.

Typically, a metal tip member, such as made from a stainless steel, is adhered to the end of flexible probe body by epoxy resin. However, the adhesion of the epoxy resin to the flexible probe body is poor because of their material property, so that the flexible probe body easily peels away.

As disclosed in U.S. Pat. No. 6,379,039, thermometers provide insert which has a scabrous outer (or perimeter) surface and may be held or secured within passageway of probe stem by mechanical friction. Insert is secured within passageway by a molding weld. Where probe stem is made of hydrogenated acrylonitrile butadiene rubber, insert is preferably an acrylonitrile-butadiene-styrene (ABS). Nevertheless, these thermometers still have some issues such as high process complexity, high fabrication cost, and limitation of materials selected for intermolding compatibility with probe stem.

SUMMARY OF THE INVENTION

An exemplary embodiment of the present invention overcomes the above-described problems by providing a thermometer is constituted by a flexible probe body and a metal tip member with a thermal contact surface. The flexible probe body including a narrower space neighboring the metal tip member and a wider space communicated with the narrower space is secured to the metal tip member by a hook structure. A thermal sensor mounted on the inside of the thermal contact surface of the metal tip member is adapted for sensing the temperature of the thermal contact surface and producing a temperature signal. A set of lead wires is coupled to the thermal sensor for transmission of the temperature signal. In particular, a thermally conductive adhesive material filling the metal tip member, the narrower space and the wider space is cured to integrately form the hook structure.

Another exemplary embodiment of the present invention overcomes the above-described problems by providing a thermometer is constituted by a flexible probe body and a metal tip member with a thermal contact surface. The flexible probe body including a narrower space neighboring the metal tip member and a wider space communicated with the narrower space is secured to the metal tip member by a hook structure. The hook structure is made of a cured thermally conductive adhesive material passing through the metal tip member, the narrower space and the wider space. A thermal sensor mounted on the inside of the thermal contact surface of the metal tip member is adapted for sensing the temperature of the thermal contact surface and producing a temperature signal. A set of lead wires is coupled to the thermal sensor for transmission of the temperature signal. In particular, the hook structure comprises a first hook in the wider space against the narrower space.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
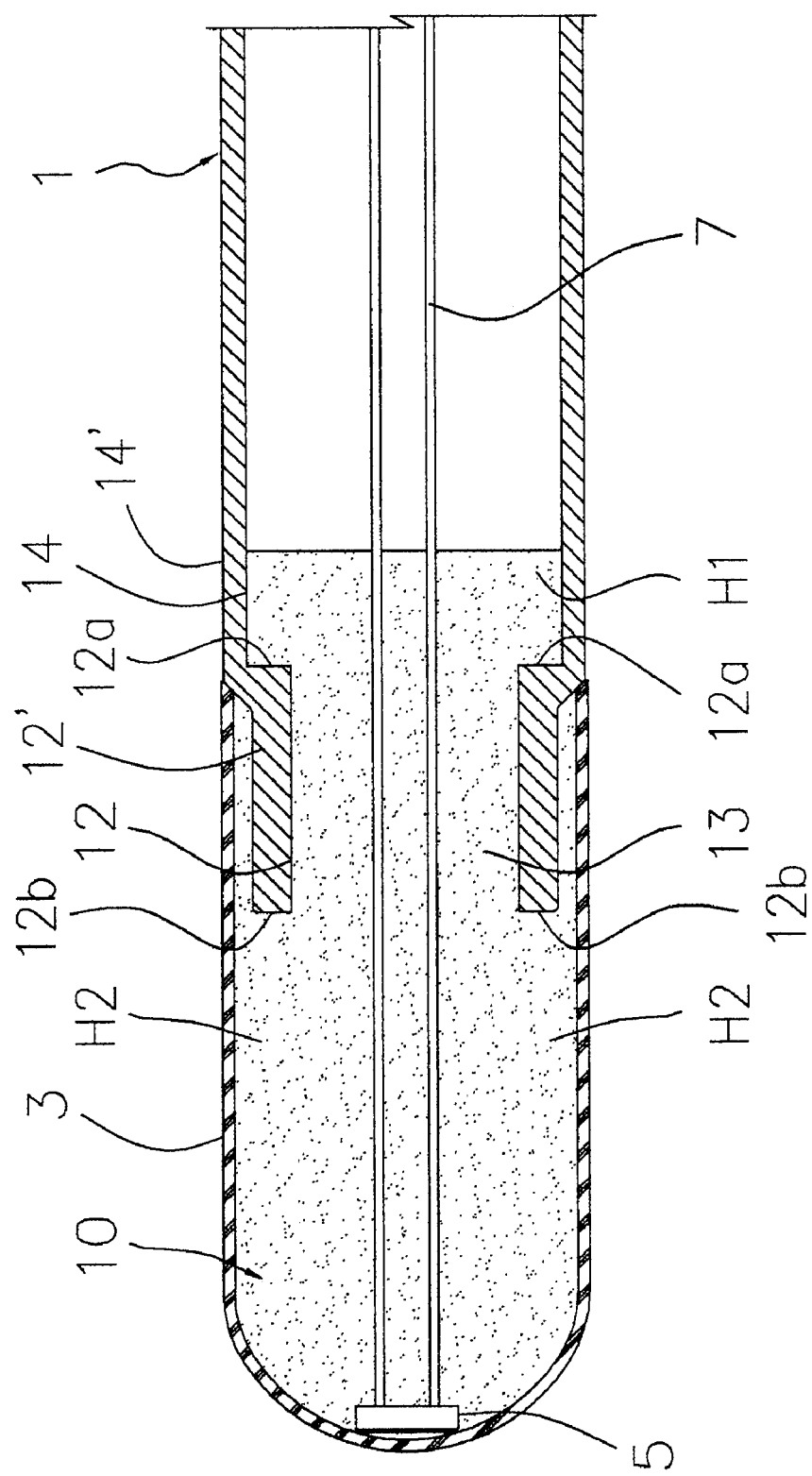
FIG. 1 is a schematic view of a thermometer according to an exemplary embodiment of the invention.

Referring to FIG. 1, an embodiment of a thermometer is illustrated. Thermometer is made up of a flexible probe body 1 and a metal tip member 3. Preferably, flexible probe body 1 comprises a narrower space 12 and a wider space 14. In this embodiment, wider space 14 is communicated with narrower space 12 neighboring metal tip member 3. In one example, flexible probe body 1 is secured to metal tip member 3 by a hook structure 10.

Flexible probe body 1 may be extended outwardly from a case with a display portion (not shown). Metal tip member 3, preferably, contains a thermal contact surface surrounding a hollow cavity. In one embodiment, metal tip member 3 is made of metal with good thermal conductivity, such as stainless steel.

A wide variety of flexible resilient materials are suitable for the flexible probe body 1 such as materials selected from the group of natural rubber, synthetic rubber, thermoplastic elastomer, thermoplastics, natural rubber latex, synthetic rubber latex, mixtures of natural rubber latex and synthetic rubber latex, and thermosets such as resilient foam.

A thermal sensor 5 is placed at the end of metal tip member 3 and mounted on the inside of the thermal contact surface. Thermal sensor 5 senses the temperature of the thermal contact surface and produces a temperature signal. There are a set of lead wires 7 coupled to thermal sensor 5 for transmission of the temperature signal.

A display unit (not shown) is disposed in the display portion and connected to lead wires 7 to receive the temperature signal for display of a corresponding temperature reading.

In one example, metal tip member 3 is made in the form of a tubular shape and closed at a domed, hemispherical or hemiellipsoid shaped end. The contact surface is brought in contact with flesh of a patient so that heat can be transferred from the patient's flesh to metal tip member 3. In one embodiment, thermal sensor 5 is thermistor. Lead wires 7 and thermistor 5 are both adhered on the inside of the thermal contact surface with heat conductive glue. Moreover, lead wires 7 are made up of a pair of electrical lead wires; they are used to connect the thermal sensor to the circuitry.

The features of the embodiment will now be described therein. Hook structure 10 is made of a cured thermally conductive adhesive material passing through metal tip member 3, narrower space 12 and wider space 14. Therefore, a hook in wider space 14 against narrower space 12 could be formed and another hook in metal tip member 3 against narrower space 12 could be optionally formed.

In one example, the above hook structure could be formed by filling metal tip member 3, narrower space 12 and wider space 14 with thermally conductive adhesive material 10 and then completely curing. Typically, thermally conductive adhesive material is an insulating material with good thermal conductivity, e.g., epoxy resin.

In this case, metal tip member 3 could be filled with or full of thermally conductive adhesive material 10 so that thermally conductive adhesive material 10 is allowed to overflow from metal tip member 3 into narrower space 12 and wider space 14, when flexible probe body 1 is inserted into metal tip member 3. Then, thermally conductive adhesive material 10 stored within metal tip member 3, narrower space 12 and wider space 14 is simultaneously cured to integrately form hook structure 10. Therefore, it is not easy to separate metal tip member 3 and flexible probe body 1 since integrated hook structure 10 may comprise hook H1 in wider space 14 against an applied pulling force along a direction. On the other hand, integrated hook structure 10 may optionally comprise another hook H2 in metal tip member 3 to strengthen an effect against an applied pulling force along an opposite direction. For example, flexible probe body 1 may comprise a narrower portion 12' surrounding the narrower space 12 extending into metal tip member 3 and a wider portion 14' surrounding the wider space 14 communicated with the narrower space 12. And the hook structure 10 may comprise a first hook H1, embedded in the wider space 14 against a rear end 12a of the narrower portion 12' of the flexible probe body 1; a second hook H2, embedded in the metal tip member 3 against a front end 12b of the narrower portion 12' of the flexible probe body 1; and a hook connection 13, embedded in the narrower space 12 to connect the first hook H1 and the second hook H2. Furthermore, the hook structure 10 could be an integral structure without interface among the first hook H1, the second hook H2, and the hook connection 13, since it is formed by simultaneously filling the metal tip member 3, the narrower space 12 and the wider space 14 with the thermally conductive adhesive material and then curing.

Referring to FIGS. 2-6, exemplary embodiments of a thermometer is further illustrated, while explanation of the same or similar portions to the description in FIG. 1 will be omitted.

Figure 2:
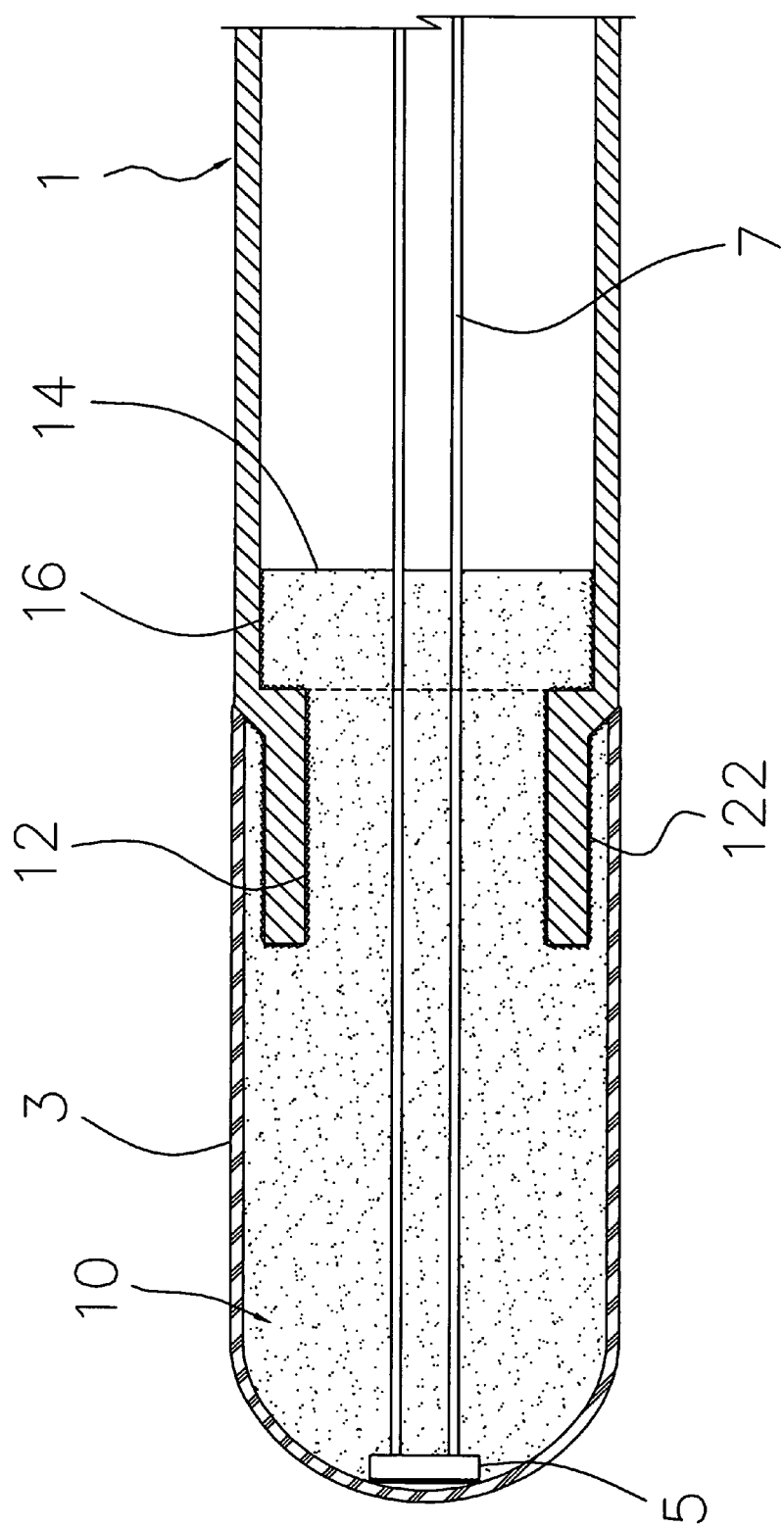
FIG. 2 is a schematic view of a thermometer according to an exemplary embodiment of the invention.

To enhance mechanical frictional force, the inner surface of flexible probe body 1, surrounding narrower space 12 or wider space 14, is a rough surface or a surface with saw teeth 122 thereon for firmly securing metal tip member 3 to flexible probe body 1 by integrated hook structure, as shown in FIG. 2.

Figure 3:
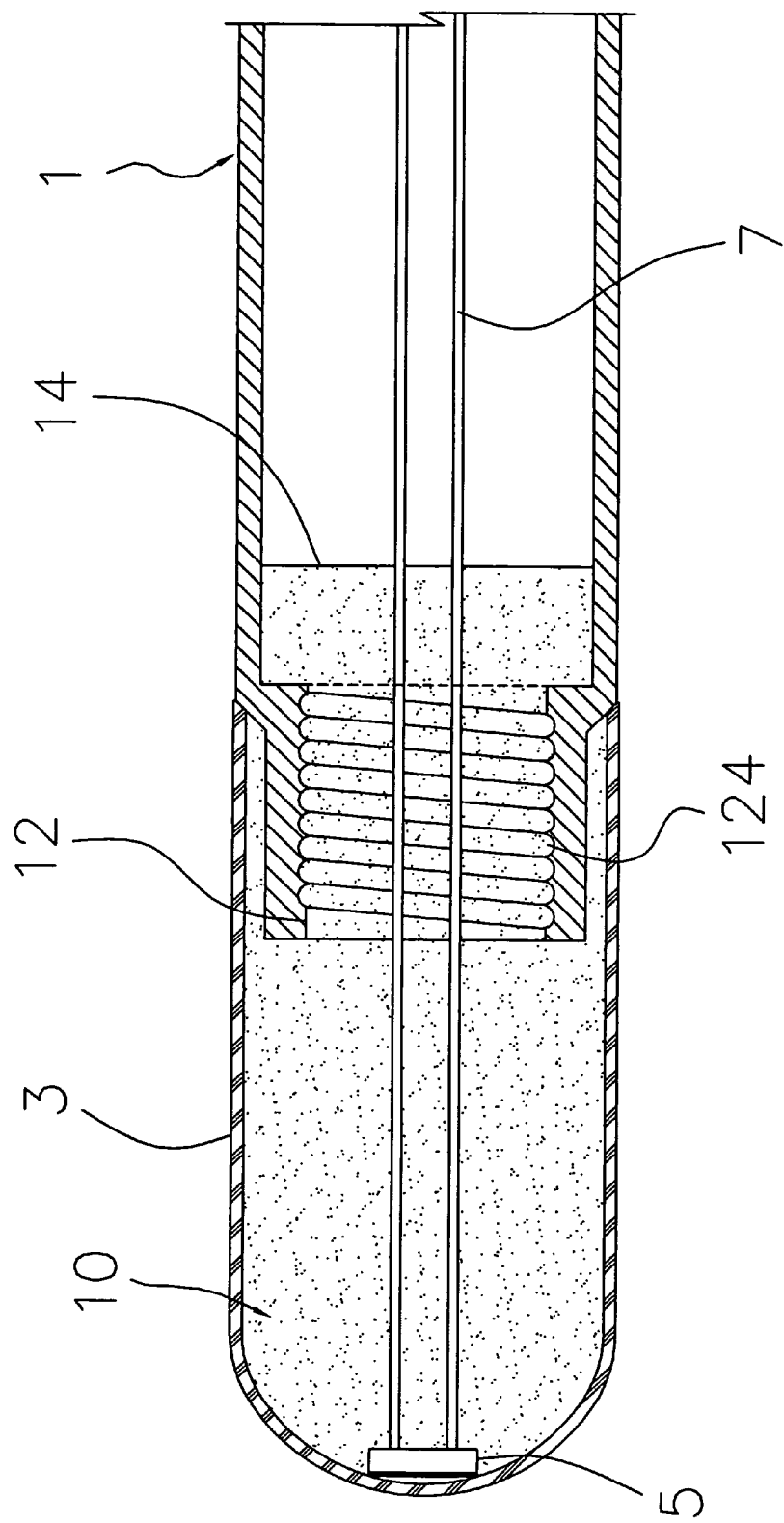
FIG. 3 is a schematic view of a thermometer according to an exemplary embodiment of the invention.

Turning now to FIG. 3, in another exemplary embodiment, the inner surface of flexible probe body 1 surrounding narrower space 12 or wider space 14 may further comprise a screw thread 124 thereon for firmly securing metal tip member 3 to flexible probe body 1 by integrated hook structure.

Figure 4:
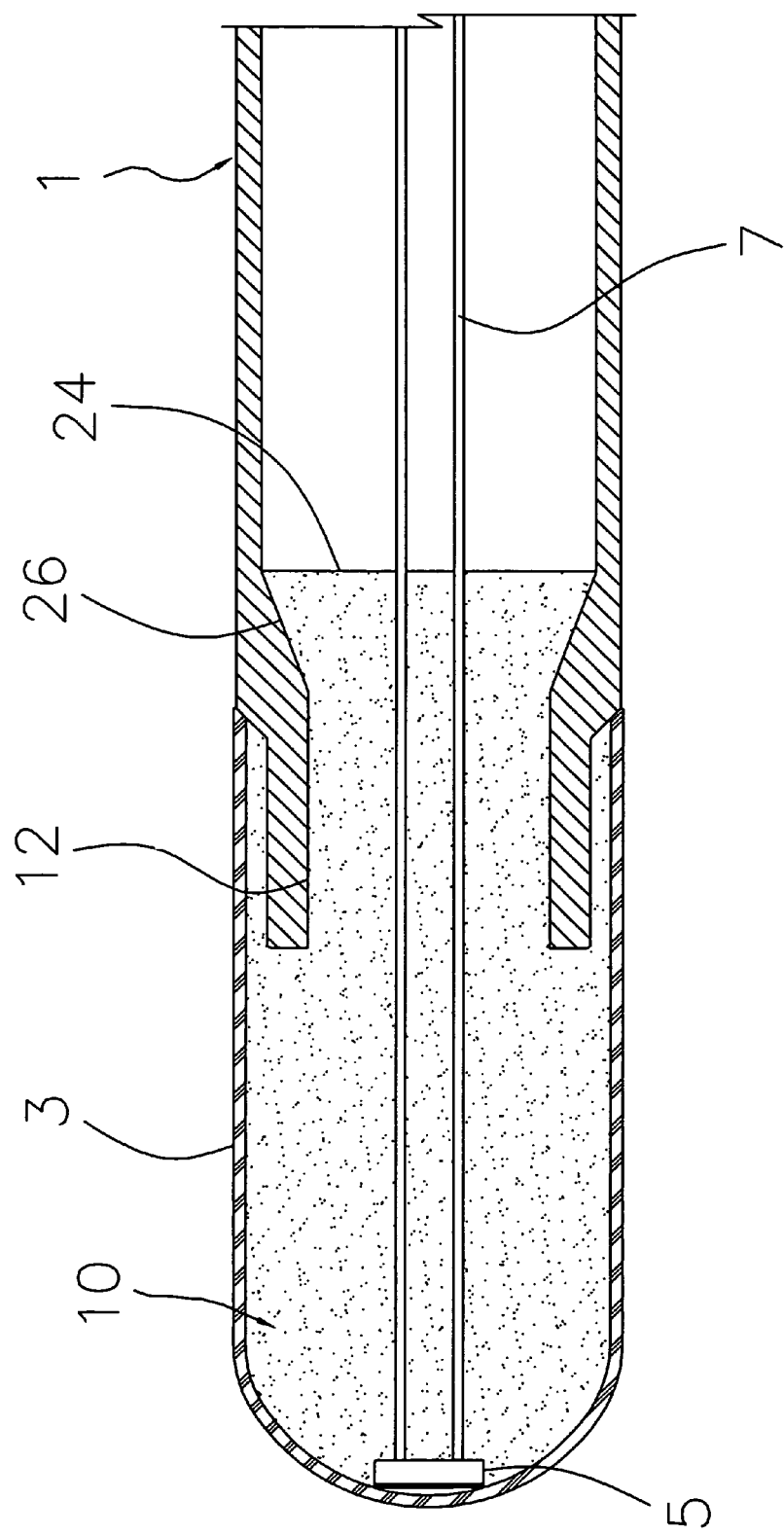
FIG. 4 is a schematic view of a thermometer according to an exemplary embodiment of the invention.
Figure 5:
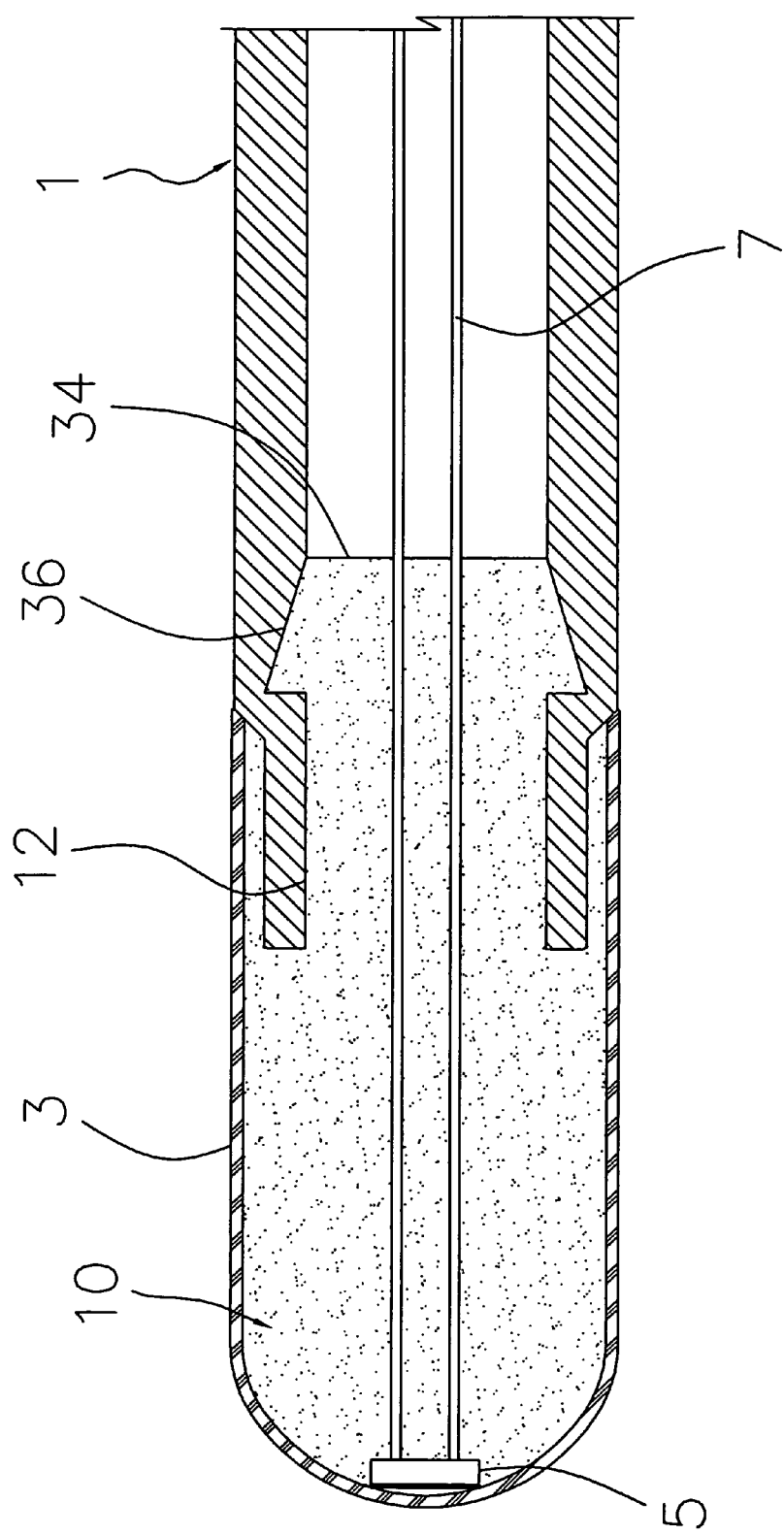
FIG. 5 is a schematic view of a thermometer according to an exemplary embodiment of the invention.

Additionally, referring to FIGS. 4-5, a width of wider space may be gradually changed toward narrower space. For example, the width 26 of wider space 24 is gradually decreased toward narrower space 12 as shown in FIG. 4. Optionally, the inner wall of flexible probe body toward the distal end of casing could be thinner. On the other hand, the width 36 of wider space 34 is gradually increased toward narrower space 12 as shown in FIG. 5. In this case, optionally, the inner wall of flexible probe body 1 toward the distal end of casing could be thicker.

Figure 6:
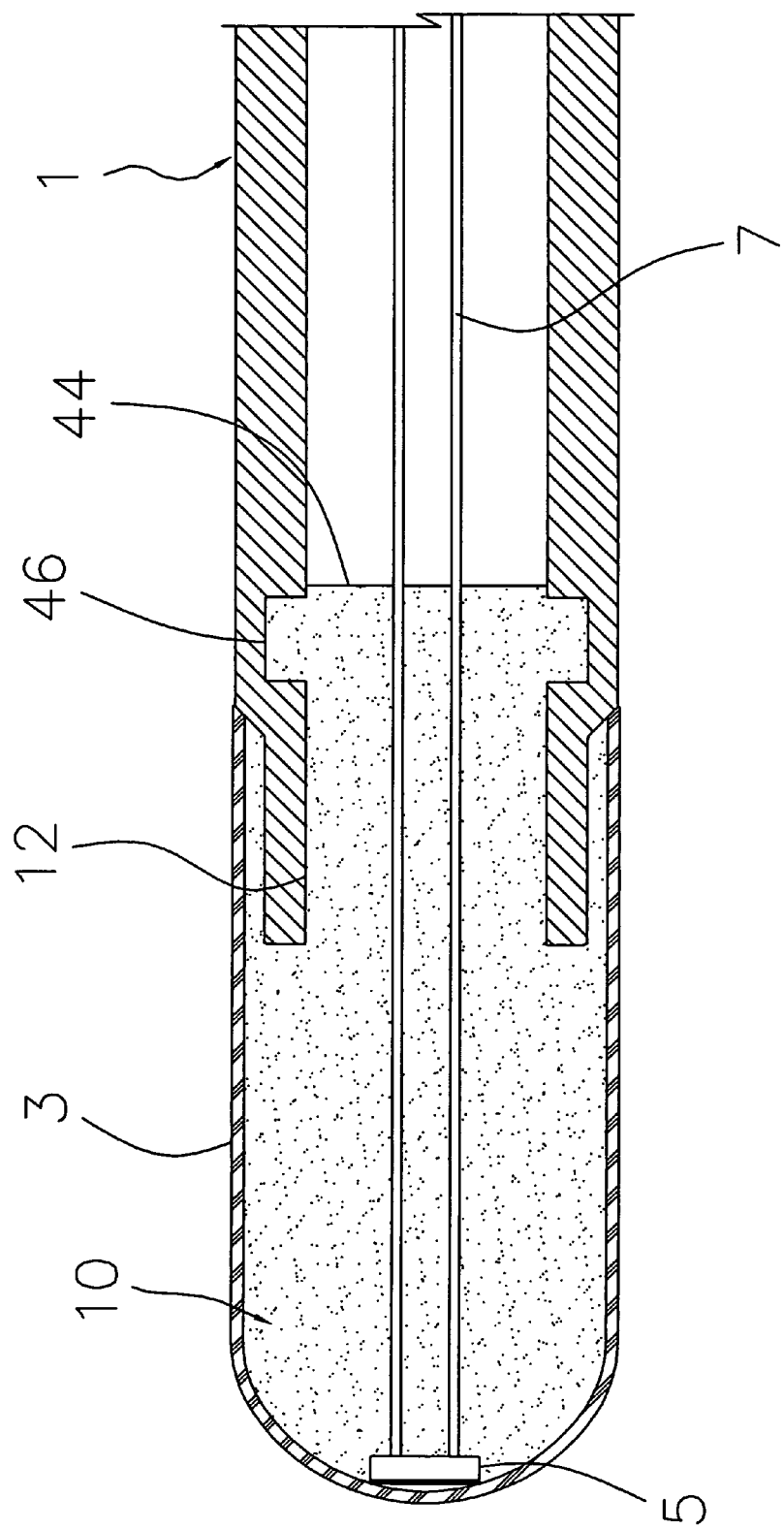
FIG. 6 is a schematic view of a thermometer according to an exemplary embodiment of the invention.

Turning now to FIG. 6, in another exemplary embodiment, an inner wall of flexible probe body 1 is designed to provide a trench 46 therein surrounding wider space 44. Therefore, the inner wall of flexible probe body 1 toward the distal end of casing could be unchanged.

In the above-described embodiments, metal tip member could be more firmly secured to flexible probe body by integrated hook structure via a process with a lower production cost and without complexity.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A thermometer comprising:

a metal tip member with a thermal contact surface;

a flexible probe body, comprising an outer narrower portion surrounding an inner narrower space extending into the metal tip member and an outer wider portion surrounding an inner wider space disposed behind the metal tip member and communicated with the inner narrower space, secured to the metal tip member by a hook structure;

a thermal sensor, mounted on the inside of the thermal contact surface of the metal tip member, for sensing the temperature of the thermal contact surface and producing a temperature signal; and a set of lead wires, coupled to the thermal sensor for transmission of the temperature signal;

wherein the hook structure comprises:

a first hook, disposed behind the metal tip member and embedded in the inner wider space against a rear end of the outer narrower portion of the flexible probe body;

a second hook, embedded in the metal tip member against a front end of the outer narrower portion of the flexible probe body; and a hook connection, embedded in the inner narrower space to connect the first hook and the second hook, wherein the first hook, the second hook and the hook connection are formed as one piece passing through the metal tip member, the inner narrower space and the inner wider space.

2. The thermometer as recited in claim 1 wherein an inner surface of the flexible probe body surrounding the narrower space or the wider space is a rough surface for firmly securing the metal tip member to the flexible probe body by the hook structure.

3. The thermometer as recited in claim 1 wherein an inner surface of the flexible probe body surrounding the narrower space or the wider space comprises saw teeth thereon for firmly securing the metal tip member to the flexible probe body by the hook structure.

4. The thermometer as recited in claim 1 wherein an inner surface of the flexible probe body surrounding the narrower space or the wider space comprises a screw thread thereon for firmly securing the metal tip member to the flexible probe body by the hook structure.

5. The thermometer as recited in claim 1 wherein a width of the wider space is gradually changed toward the narrower space.

6. The thermometer as recited in claim 5 wherein the width of the wider space is gradually decreased toward the narrower space.

7. The thermometer as recited in claim 5 wherein the width of the wider space is gradually increased toward the narrower space.

8. The thermometer as recited in claim 1 wherein an inner surface of the flexible probe body comprises a trench therein surrounding the wider space.

9. The thermometer as recited in claim 1 wherein the hook structure is formed by simultaneously filling the metal tip member, the narrower space and the wider space with a thermally conductive adhesive material and curing the thermally conductive adhesive material.

10. The thermometer as recited in claim 9 wherein the thermally conductive adhesive material is epoxy resin.

11. The thermometer as recited in claim 1 wherein the hook structure is an integral structure without interface among the first hook, the second hook, and the hook connection.

* * * * *